United States Patent
Sagayama et al.

(10) Patent No.: US 10,513,995 B2
(45) Date of Patent: Dec. 24, 2019

(54) CONTROL APPARATUS AND CONTROL METHOD FOR INTERNAL COMBUSTION ENGINE

(71) Applicant: Mitsubishi Electric Corporation, Tokyo (JP)

(72) Inventors: Noriya Sagayama, Tokyo (JP); Nozomu Kamioka, Tokyo (JP); Satoshi Wachi, Tokyo (JP); Toshiaki Date, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 95 days.

(21) Appl. No.: 15/022,959

(22) PCT Filed: Oct. 10, 2013

(86) PCT No.: PCT/JP2013/077659
§ 371 (c)(1),
(2) Date: Mar. 18, 2016

(87) PCT Pub. No.: WO2015/052815
PCT Pub. Date: Apr. 16, 2015

(65) Prior Publication Data
US 2016/0312724 A1    Oct. 27, 2016

(51) Int. Cl.
*F02D 41/06*  (2006.01)
*F02D 41/00*  (2006.01)
(Continued)

(52) U.S. Cl.
CPC .......... *F02D 41/062* (2013.01); *F02B 63/04* (2013.01); *F02D 41/0002* (2013.01); *F02D 41/3005* (2013.01); *F02N 11/08* (2013.01)

(58) Field of Classification Search
CPC .............. F02D 41/0002; F02D 41/062; F02D 41/3005; F02D 41/32; F02D 2200/0406;
(Continued)

(56) References Cited

U.S. PATENT DOCUMENTS 4,455,266 A * 6/1984 Gerhardy ................. F02M 1/16
                                                                   261/35
6,018,198 A * 1/2000 Tsuzuki ..................... B60K 6/365
                                                                180/65.25
(Continued)

FOREIGN PATENT DOCUMENTS

JP      2000-234530 A     8/2000
JP      2005-120969 A     5/2005
(Continued)

OTHER PUBLICATIONS

International Search Report for PCT/JP2013/077659 dated Nov. 19, 2013 [PCT/ISA/210].
(Continued)

*Primary Examiner* — Hai H Huynh
*Assistant Examiner* — Gonzalo Laguarda
(74) *Attorney, Agent, or Firm* — Sughrue Mion, PLLC; Richard C. Turner

(57) ABSTRACT

A throttle valve 11 that adjusts an amount of air flowing into an intake passage of an internal combustion engine 1, a fuel injection valve 9 that injects fuel into the internal combustion engine 1, and a generator-motor 6 that drives the internal combustion engine 1 via a drive belt 5 are controlled by an internal combustion engine control unit 13. The internal combustion engine control unit 13 opens the throttle valve 11 to a first throttle opening after detecting a request to start the internal combustion engine 1, then causes the fuel injection valve 9 to inject fuel while maintaining the first throttle opening, and then opens the throttle valve 11 to a
(Continued)

second throttle opening that is larger than the first throttle opening.

9 Claims, 4 Drawing Sheets

(51) Int. Cl.
    *F02B 63/04*     (2006.01)
    *F02D 41/30*     (2006.01)
    *F02N 11/08*     (2006.01)

(58) Field of Classification Search
    CPC .... F02D 2200/021; F02D 11/10; F02N 11/08;
                              F02N 11/04; Y02T 10/42
    See application file for complete search history.

(56) References Cited

U.S. PATENT DOCUMENTS

| | | | | |
|---|---|---|---|---|
| 7,082,930 | B2* | 8/2006 | Liller | B60K 6/48 |
| | | | | 123/179.16 |
| 9,371,790 | B2* | 6/2016 | Ruona | F02D 35/024 |
| 9,708,986 | B2* | 7/2017 | Yasuda | F02D 41/0002 |
| 2006/0060162 | A1* | 3/2006 | Fukui | F02D 41/062 |
| | | | | 123/179.16 |
| 2008/0216465 | A1* | 9/2008 | Ando | F02D 41/0255 |
| | | | | 60/284 |
| 2009/0281710 | A1* | 11/2009 | Mallebrein | F02D 41/1458 |
| | | | | 701/104 |
| 2009/0287387 | A1* | 11/2009 | Tomoda | F16D 25/086 |
| | | | | 701/68 |
| 2011/0088659 | A1* | 4/2011 | Wang | B60K 6/485 |
| | | | | 123/350 |
| 2011/0197860 | A1* | 8/2011 | Aso | F02D 41/047 |
| | | | | 123/491 |
| 2012/0138005 | A1* | 6/2012 | White | F02D 41/062 |
| | | | | 123/179.3 |
| 2013/0066540 | A1* | 3/2013 | Lewis | F02D 41/042 |
| | | | | 701/113 |

FOREIGN PATENT DOCUMENTS

| | | |
|---|---|---|
| JP | 2006-250102 A | 9/2006 |
| JP | 2008-232054 A | 10/2008 |
| JP | 2010-203346 A | 9/2010 |
| JP | 2013-217260 A | 10/2013 |

OTHER PUBLICATIONS

Written Opinion for PCT/JP2013/077659 dated Nov. 19, 2013 [PCT/ISA/237].

Communication, dated May 10, 2016, from the Japanese Patent Office in counterpart Japanese application No. 2015-541384.

* cited by examiner

CONTROL APPARATUS AND CONTROL METHOD FOR INTERNAL COMBUSTION ENGINE

CROSS REFERENCE TO RELATED APPLICATIONS

This application is a National Stage of International Application No. PCT/JP2013/077659, filed on Oct. 10, 2013, the contents of all of which are incorporated herein by reference in their entirety.

TECHNICAL FIELD

This invention relates to a control apparatus and a control method for an internal combustion engine, and more particularly to a control apparatus and a control method for an internal combustion engine with which to reduce shock during startup of the internal combustion engine.

BACKGROUND ART

In a conventional control apparatus for an internal combustion engine installed in a vehicle, a throttle valve is operated when executing cranking on the internal combustion engine in order to start the internal combustion engine. As a result, negative pressure is generated rapidly on a downstream side of the throttle valve. Further, shock is suppressed during startup by securing torque continuity.

PTL 1 describes an example of a conventional control apparatus that performs this type of control. In PTL 1, a throttle valve is fully closed when cranking is executed so that negative pressure is generated rapidly on a downstream side of the throttle valve. The throttle valve is then opened to a preset throttle opening prior to a fuel injection timing. In so doing, an amount of air taken in during startup of the internal combustion engine is reduced, and as a result, an amount of torque generated during complete combustion in the internal combustion engine is suppressed. Further, torque continuity is secured by aligning a timing at which negative pressure in an intake passage reaches a peak with a timing at which the internal combustion engine reaches a complete combustion state, and as a result, shock generation in the internal combustion engine is prevented. Note that here, the complete combustion state denotes a state of complete combustion following the beginning of a startup operation in the internal combustion engine.

CITATION LIST

Patent Literature

[PTL 1] JP 2010-203346 A

SUMMARY OF INVENTION

Technical Problem

With the conventional control apparatus described in PTL 1, however, the following problems occur.

In the conventional control apparatus of PTL 1, as described above, the throttle valve is initially fully closed when cranking is executed on the engine. The throttle valve is then opened to the preset opening prior to the fuel injection timing. As a result, shock during startup is suppressed. However, in a situation where it is necessary to prioritize startability in the internal combustion engine, for example when a water temperature of the internal combustion engine is extremely low, the intake air amount is increased using following methods. In one method, control is implemented to shorten a period in which the throttle valve is closed. In another method, control is implemented to eliminate the period in which the throttle valve is closed. By increasing an absolute value of the peak of the negative pressure generated in the intake passage in this manner, the intake air amount is increased.

Here, in PTL 1, the period in which the throttle valve is closed, a timing at which the valve is opened, and an opening to which the valve is opened are determined from an estimated value of the peak of the negative pressure in the intake passage. When determining the period in which the throttle valve is closed, the timing at which the valve is opened, and the opening to which the valve is opened, it is necessary, in consideration of a deviation between the estimated value of the peak of the negative pressure and the actual peak value of the negative pressure, to ensure that the internal combustion engine is started reliably by setting the estimated value of the peak of the negative pressure at a higher value than a minimum negative pressure value at which the internal combustion engine can be started (in other words, a minimum negative pressure value at which the internal combustion engine is started reliably). Therefore, when startability is prioritized, shock occurring in the engine during startup cannot be suppressed, and as a result, a driver experiences discomfort.

Furthermore, in PTL 1, the throttle valve is opened prior to the fuel injection timing, making it difficult to stabilize the negative pressure in the intake passage during fuel injection. Accordingly, a fuel injection amount determined on the basis of the negative pressure in the intake passage cannot always be reduced to a minimum required amount, and as a result, fuel may be injected in an excessive amount such that a fuel consumption amount cannot be suppressed.

Moreover, in PTL 1, a determination is not made as to whether or not the internal combustion engine is rotating with stability. Therefore, when the torque generated by the internal combustion engine is insufficient, an engine starting apparatus may be stopped, leading to a reduction in a rotation speed of the internal combustion engine.

This invention has been made in order to solve the problems described above, and an object thereof is to provide a control apparatus and a control method for an internal combustion engine, with which shock can be suppressed during startup of the internal combustion engine, even in a situation where it is necessary to prioritize startability, and with which a fuel consumption amount can be suppressed following startup of the internal combustion engine.

Solution to Problem

This invention is a control apparatus for an internal combustion engine, including a throttle valve that adjusts an amount of air flowing into an intake passage of the internal combustion engine, a fuel injection valve that injects fuel into the internal combustion engine, a generator-motor coupled to the internal combustion engine via a belt in order to drive the internal combustion engine, and an internal combustion engine control unit that controls the throttle valve, the fuel injection valve, and the generator-motor, wherein the internal combustion engine control unit opens the throttle valve to a first throttle opening after detecting a request to start the internal combustion engine, then causes the fuel injection valve to inject fuel while maintaining the throttle valve at the first throttle opening, and then opens the throttle valve to a second throttle opening that is larger than the first throttle opening.

Advantageous Effects of Invention

This invention is a control apparatus for an internal combustion engine, including a throttle valve that adjusts an amount of air flowing into an intake passage of the internal combustion engine, a fuel injection valve that injects fuel into the internal combustion engine, a generator-motor coupled to the internal combustion engine via a belt in order to drive the internal combustion engine, and an internal combustion engine control unit that controls the throttle valve, the fuel injection valve, and the generator-motor, wherein the internal combustion engine control unit opens the throttle valve to a first throttle opening after detecting a request to start the internal combustion engine, then causes the fuel injection valve to inject fuel while maintaining the throttle valve at the first throttle opening, and then opens the throttle valve to a second throttle opening that is larger than the first throttle opening. Therefore, shock can be suppressed during startup of the internal combustion engine even in a situation where it is necessary to prioritize startability, and a fuel consumption amount can be suppressed following startup of the internal combustion engine.

DESCRIPTION OF EMBODIMENTS

Figure 1:
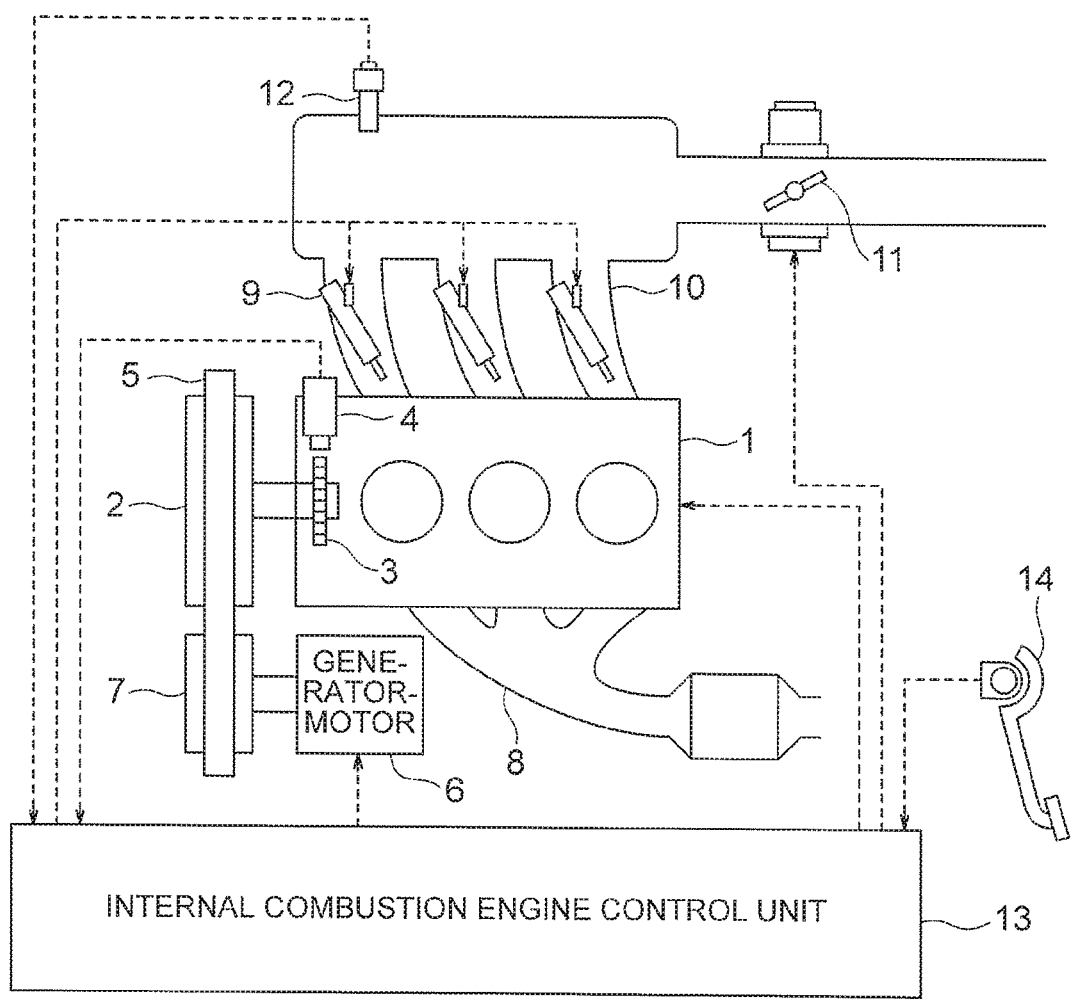
FIG. 1 is a view showing a configuration of a control apparatus for an internal combustion engine according to a first embodiment of this invention.

A control apparatus and a control method for an internal combustion engine according to an embodiment of this invention will be described below using the drawings. Note that in the drawings, identical constituent elements have been allocated identical reference symbols, and duplicate description thereof has been omitted.

First Embodiment

FIG. 1 is a view showing a configuration of a control apparatus for an internal combustion engine (referred to hereafter simply as a control apparatus) according to a first embodiment of this invention.

The control apparatus according to the first embodiment controls an internal combustion engine 1. As shown in FIG. 1, the control apparatus includes a crank pulley 2, a crank angle detecting ring gear 3, a crank angle sensor 4, a drive belt 5, a generator-motor 6, a generator-motor drive pulley 7, a fuel injection valve 9, a throttle valve 11, a negative pressure detector 12, an internal combustion engine control unit 13, and an accelerator pedal 14. The internal combustion engine 1 includes an intake passage 10 for supplying air to the internal combustion engine 1, and an exhaust passage 8 for discharging exhaust gas from the internal combustion engine 1 into the atmosphere. The crank angle detecting ring gear 3 is directly connected to the internal combustion engine 1. Therefore, when the internal combustion engine 1 rotates, the crank angle detecting ring gear 3 rotates. The crank angle sensor 4 determines a crank angle of the internal combustion engine 1 by detecting the rotation of the crank angle detecting ring gear 3, and in so doing detects a rotation speed of the internal combustion engine 1. Rotation information relating to the internal combustion engine 1, obtained by the crank angle sensor 4, is transmitted to the internal combustion engine control unit 13.

The intake passage 10 includes a throttle valve 11. The throttle valve 11 adjusts an amount of air flowing into the intake passage 10 in accordance with the control executed by the internal combustion engine control unit 13. As a result, intake air flows into the interior of the internal combustion engine 1 through the intake passage 10 in an amount adjusted by the throttle valve 11.

Negative pressure in the intake passage 10 is detected by the negative pressure detector 12. Information indicating the detected negative pressure is transmitted to the internal combustion engine control unit 13.

The internal combustion engine control unit 13 calculates a fuel injection amount of the fuel injection valve 9 on the basis of the information indicating the negative pressure in the intake passage 10, obtained by the negative pressure detector 12. The fuel injection valve 9 injects fuel into the interior of the internal combustion engine 1 in the fuel injection amount calculated by the internal combustion engine control unit 13.

The accelerator pedal 14 is provided with an accelerator position sensor (not shown) for detecting an amount (an accelerator opening APS1) by which a driver depresses the accelerator pedal 14. Accelerator opening information obtained by the accelerator position sensor is transmitted to the internal combustion engine control unit 13.

Exhaust gas generated when fuel is burned in the interior of the internal combustion engine 1 is released into the atmosphere through the exhaust passage 8.

The crank pulley 2 is coupled to the internal combustion engine 1. The generator-motor drive pulley 7 is coupled to the generator-motor 6. The crank pulley 2 and the generator-motor drive pulley 7 are coupled by the drive belt 5. Accordingly, the generator-motor 6 is coupled to the internal combustion engine 1 via the crank pulley 2, the drive belt 5, and the generator-motor drive pulley 7. As a result, the internal combustion engine 1 can be rotated by torque output from the generator-motor 6. Further, the generator-motor 6 can be rotated by torque output from the internal combustion engine 1.

In this embodiment, the generator-motor 6 is used as a starting device (a starter motor) for starting the internal combustion engine 1. More specifically, when the internal combustion engine 1 is started, drive torque is transmitted from the generator-motor 6 to the internal combustion engine 1 by the drive belt 5 in order to start the internal combustion engine 1. Note that the starting device for the internal combustion engine 1 is not limited to the generator-motor 6 shown in FIG. 1, and any device capable of causing the internal combustion engine 1 to rotate, such as a gear meshing type generator-motor or a gear meshing type motor, may be used.

The information indicating the negative pressure detected by the negative pressure detector 12, the information indicating the accelerator opening of the accelerator pedal 14, and the rotation information relating to the internal combustion engine 1, detected by the crank angle sensor 4, are input into the internal combustion engine control unit 13. The internal combustion engine control unit 13 uses at least one of these information to control driving of the generator-motor 6, an opening of the fuel injection valve 9 (i.e. the fuel injection amount), and a throttle opening of the throttle valve 11. The internal combustion engine control unit 13 also performs control for stopping the internal combustion engine 1.

Next, control performed during startup of the internal combustion engine 1 will be described.

Figure 2:
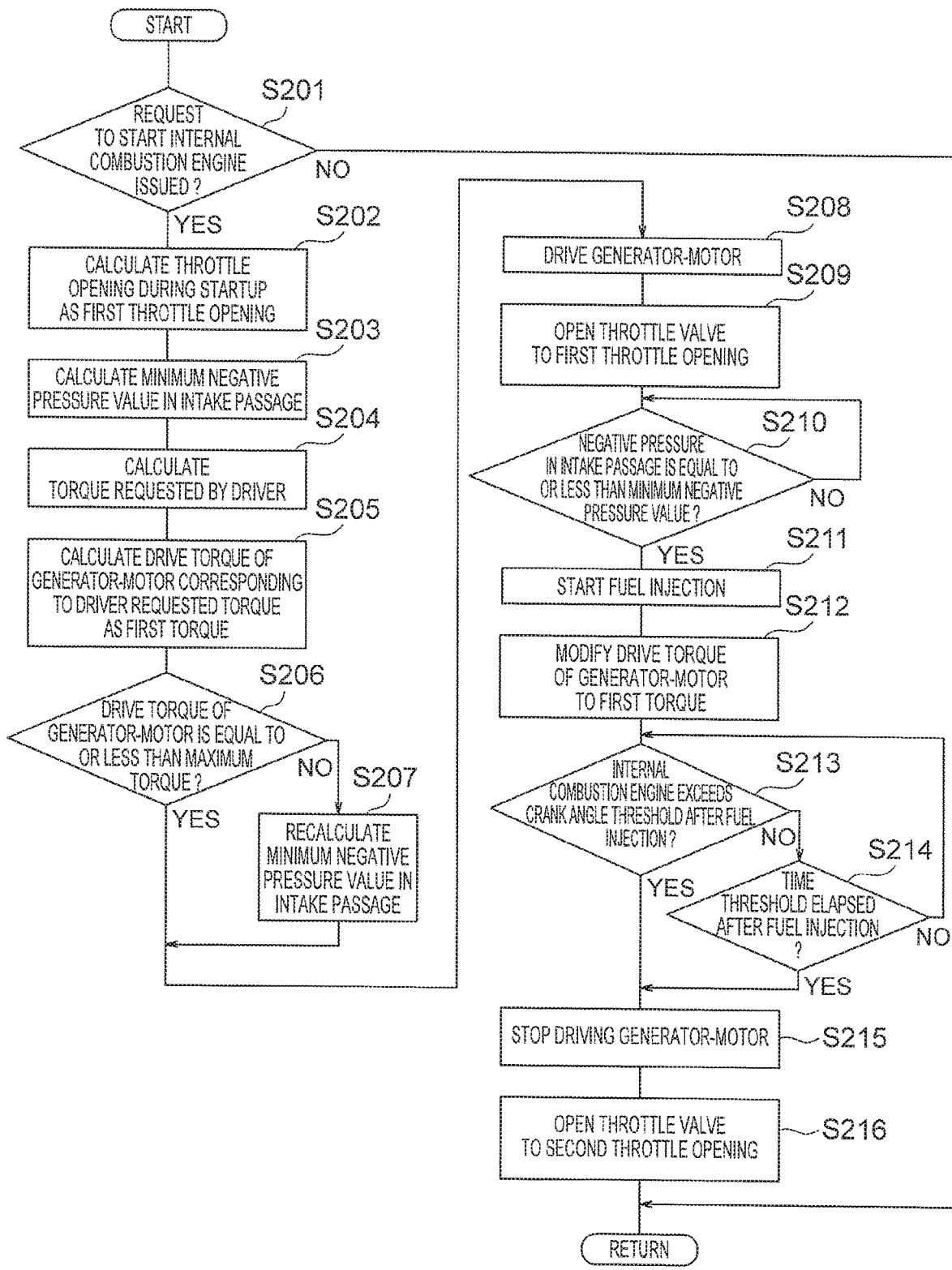
FIG. 2 is a flowchart showing an operation of the control apparatus for an internal combustion engine according to the first embodiment of this invention.

The control apparatus according to this embodiment performs processing shown on a flowchart in FIG. 2 to control startup of the internal combustion engine 1.

As shown in FIG. 2, a START condition is established while the internal combustion engine 1 is stopped. The internal combustion engine 1 is stopped by control performed by the internal combustion engine control unit 13. The internal combustion engine 1 is stopped when, for example, an ignition is switched OFF, idling is stopped or idling reduction is implemented, the internal combustion engine control unit 13 stops the internal combustion engine 1 intentionally for a particular reason, and so on.

In step S201, the internal combustion engine control unit 13 determines whether or not a request to start the internal combustion engine 1 has been issued. Examples of conditions for determining whether or not a start request has been issued include whether or not the driver has depressed the accelerator pedal 14, whether or not the driver has operated an ignition key or an ignition switch, whether or not the driver has taken his/her foot off a brake pedal, and so on. Any one of these conditions may be employed as the condition for determining whether or not a start request has been issued. When a request to start the internal combustion engine 1 has been issued, the routine advances to step S202. On the other hand, when a request to start the internal combustion engine 1 has not been issued, a RETURN condition is established and the startup control is terminated.

In step S202, the internal combustion engine control unit 13 determines the throttle opening of the throttle valve 11 during startup of the internal combustion engine 1 as a first throttle opening TH1.

Figure 4A:
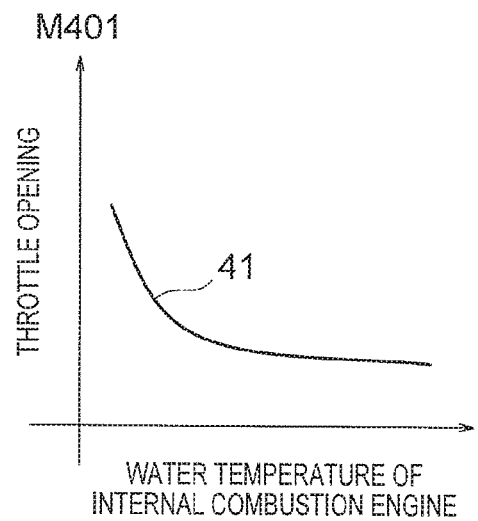
FIG. 4 is a view showing map tables used by the control apparatus for an internal combustion engine according to the first embodiment of this invention.

The first throttle opening TH1 is determined using a map table M401 shown in FIG. 4A, for example. On the map table M401 shown in FIG. 4A, the horizontal axis shows a water temperature of cooling water in the internal combustion engine 1, and the vertical axis shows the first throttle opening TH1 (the throttle opening during startup of the internal combustion engine 1). A relationship between the water temperature of the cooling water in the internal combustion engine 1 and the first throttle opening TH1 is as shown by a solid line 41 on the map table M401 of FIG. 4A. Hence, a value of the first throttle opening TH1 is stored in advance on the map table M401 for each water temperature of the cooling water in the internal combustion engine 1. The first throttle opening TH1 is therefore determined from the map table M401 on the basis of the water temperature of the cooling water in the internal combustion engine 1. Note that the first throttle opening TH1 is an opening of the throttle valve 11 at which a minimum negative pressure (a minimum negative pressure value V1) required to achieve complete combustion in the internal combustion engine 1 can be generated. In other words, as long as the throttle opening of the throttle valve 11 is maintained at the first throttle opening TH1, complete combustion is achieved reliably in the internal combustion engine 1. Note that the first throttle opening TH1 is not limited to this example, and may be determined using another method.

In step S203, the internal combustion engine control unit 13 determines the minimum negative pressure value V1 in the intake passage 10 in order to determine a timing at which to start fuel injection from the fuel injection valve 9. The minimum negative pressure value V1 is the minimum required negative pressure at which complete combustion can be achieved in the internal combustion engine 1. In other words, as long as the value of the negative pressure in the intake passage 10 reaches the minimum negative pressure value V1, complete combustion is achieved reliably in the internal combustion engine 1.

Figure 4B:
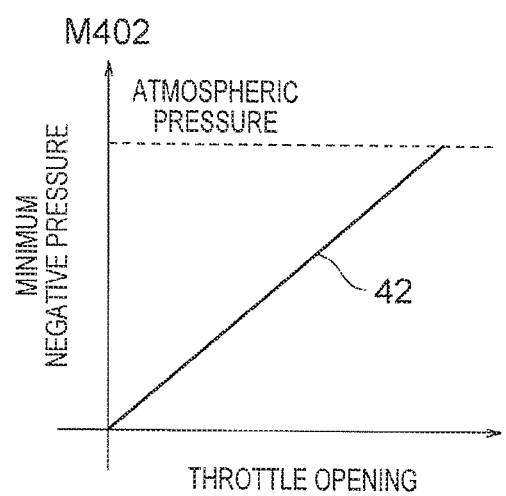

The minimum negative pressure value V1 is determined using a map table M402 shown in FIG. 4B, for example. On the map table M402 shown in FIG. 4B, the horizontal axis shows the first throttle opening TH1, and the vertical axis shows the minimum negative pressure value V1. A relationship between the first throttle opening TH1 and the minimum negative pressure value V1 is as shown by a solid line 42 on the map table M402 of FIG. 4B. Hence, the minimum negative pressure value V1 is stored in advance on the map table M402 for each value of the first throttle opening TH1. The minimum negative pressure value V1 is therefore determined from the map table M402 on the basis of the first throttle opening TH1. The minimum negative pressure value V1 in the intake passage 10 at which complete combustion can be achieved in the internal combustion engine 1 is set in this manner using the map table M402 shown in FIG. 4B. In this embodiment, the minimum negative pressure value V1 is determined in the manner described above, whereupon a determination is made in step S210, to be described below, as to whether or not the negative pressure in the intake passage 10 during startup of the internal combustion engine 1 has reached the minimum negative pressure value V1. After it is confirmed that the negative pressure in the intake passage 10 has reached the minimum negative pressure value V1, fuel injection can be started, and therefore energy generated as a result of fuel combustion can be used entirely to increase the rotation speed of the internal combustion engine 1. As a result, shock can be suppressed during complete combustion, and startability can be secured.

In step S204, the internal combustion engine control unit 13 calculates a driver requested torque TR2 requested by the driver using Equation (1), shown below, on the basis of the accelerator opening APS1 of the accelerator pedal 14. The driver requested torque TR2 is a torque requested by the driver during startup of the internal combustion engine 1. Note that a conversion factor is set as appropriate in advance.

$$TR2 = APS1 \times \text{conversion factor} \quad (1)$$

Here, the driver requested torque TR2 is a torque required from step S211 (the start of fuel injection), to be described below, to step S216 (where the throttle opening is set at a second throttle opening TH2), to be described below.

In step S205, the internal combustion engine control unit 13 determines a torque TR3 to be output by the internal combustion engine 1 by means of fuel combustion between step S211 and step S216. The internal combustion engine control unit 13 then calculates a drive torque of the generator-motor 6 corresponding to the driver requested torque TR2 as a first torque TR1 using Equation (2), shown below, on the basis of the driver requested torque TR2 and the torque TR3.

$$TR1 = TR2 - TR3 \quad (2)$$

Figure 4C:
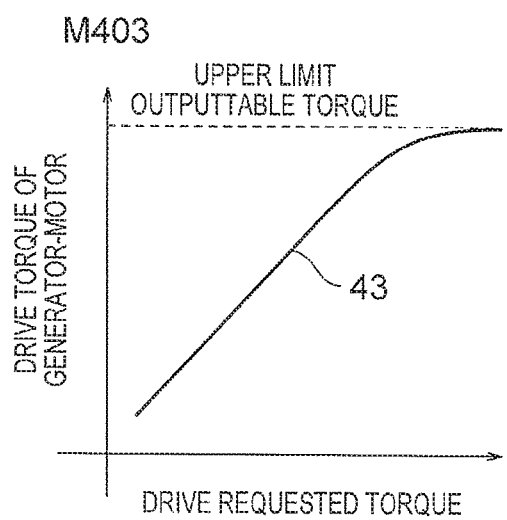

Note that the drive torque (the first torque TR1) of the generator-motor 6 corresponding to the driver requested torque TR2 may be determined using a map table M403 shown in FIG. 4C without using Equation (2). On the map table M403 of FIG. 4C, the horizontal axis shows the driver requested torque TR2 and the vertical axis shows the first torque TR1. A relationship between the driver requested torque TR2 and the first torque TR1 is as shown by a solid line 43 on the map table M403 of FIG. 4C. Hence, a value of the first torque TR1 is stored on the map table M403 in advance for each value of the driver requested torque TR2. The first torque TR1 can therefore be determined from the map table M403 on the basis of the driver requested torque TR2.

In step S206, a determination is made as to whether or not the first torque TR1 (the drive torque of the generator-motor 6) determined in step S205 is no greater than a maximum torque value that can be output by the generator-motor 6. Note that the maximum torque value is a design value of the generator-motor 6. When the first torque TR1 exceeds the maximum torque value, the routine advances to step S207. On the other hand, when the first torque TR1 does not exceed the maximum torque value, the routine advances to step S208.

In step S207, the minimum negative pressure value V1 in the intake passage 10, used to determine the fuel injection timing, is reset at a higher value than the value determined in step S203. Hence, the value of the minimum negative pressure value V1 when the first torque TR1 exceeds the maximum torque value is higher than the minimum negative pressure value V1 when the first torque TR1 does not exceed the maximum torque value. In a calculation method used to reset the minimum negative pressure value V1, a preset value is added to the minimum negative pressure value V1 determined in step S203, for example. The added value is determined as appropriate in advance on the basis of design values of the internal combustion engine 1, experiment results, and so on. By resetting the minimum negative pressure value V1 in this manner, the fuel injection timing when the first torque TR1 exceeds the maximum torque value is advanced relative to the fuel injection timing when the first torque TR1 does not exceed the maximum torque value. Accordingly, a period up to the beginning of startup of the internal combustion engine 1 becomes shorter than that when the first torque TR1 does not exceed the maximum torque value. As a result, shock tends to occur during startup, but since the driver has intentionally issued a torque request, the shock is permitted.

In step S208, the internal combustion engine control unit 13 drives the generator-motor 6 in order to rotate the internal combustion engine 1. At this time, the drive torque of the generator-motor 6 is a torque at which the rotation speed of the internal combustion engine 1 can be increased quickly to a preset rotation speed. The drive torque at this time is therefore different from the first torque TR1 (see the drive torque between a time T301 and a time T302 in FIG. 3).

In step S209, the internal combustion engine control unit 13 opens the throttle valve 11 to the first throttle opening TH1 determined in step S202.

In step S210, the internal combustion engine control unit 13 determines on the basis of the negative pressure information from the negative pressure detector 12 whether or not the detected value of the negative pressure in the intake passage 10, detected by the negative pressure detector 12, is equal to or less than the minimum negative pressure value V1 determined in step S203 or step S207. When the detected value of the negative pressure is equal to or less than the minimum negative pressure value, the routine advances to step S211. On the other hand, when the detected value of the negative pressure is higher than the minimum negative pressure value, the routine returns to step S210.

Hence, in step S210, the internal combustion engine control unit 13 waits for the detected value of the negative pressure to fall to or below the minimum negative pressure value. At this time, as described above, the value of the minimum negative pressure value V1 when the first torque TR1 exceeds the maximum torque value is higher than the minimum negative pressure value V1 when the first torque TR1 does not exceed the maximum torque value. Therefore, a wait time when the first torque TR1 exceeds the maximum torque value is shorter than the wait time when the first torque TR1 does not exceed the maximum torque value. In either case, however, it is possible to determine reliably, from the determination of step S210, whether or not the detected value of the negative pressure in the intake passage 10 is equal to or less than the minimum negative pressure value at which the internal combustion engine 1 can be started, and therefore the energy generated as a result of fuel combustion can be used entirely to increase the rotation speed of the internal combustion engine 1. As a result, shock can be suppressed reliably during complete combustion, and startability can be secured reliably.

In step S211, the internal combustion engine control unit 13 determines the fuel injection amount to be injected from the fuel injection valve 9, and starts fuel injection by controlling the fuel injection valve 9 on the basis thereof.

In step S212, the internal combustion engine control unit 13 modifies the drive torque of the generator-motor 6 to the first torque TR1 calculated in step S205.

In step S213, the internal combustion engine control unit 13 determines on the basis of the output of the crank angle sensor 4 whether or not the rotation speed of the internal combustion engine 1, calculated from the crank angle, has reached a preset crank angle threshold after the start of fuel injection. When the rotation speed of the internal combustion engine 1 has not reached the crank angle threshold, the routine advances to step S214. On the other hand, when the rotation speed of the internal combustion engine 1 exceeds the crank angle threshold, the routine advances to step S215.

By increasing the crank angle threshold intentionally at this time, a period in which the internal combustion engine 1 can be operated while maintaining the throttle valve 11 at the first throttle opening TH1 can be extended, and as a result, a fuel consumption amount can be reduced in comparison with the conventional control apparatus described in PTL 1.

Further, by setting the crank angle threshold intentionally to be small in a case where the driver requested torque TR2 is greater than the maximum torque of the generator-motor 6, a timing at which the internal combustion engine 1 outputs the driver-requested torque TR2 by means of fuel combustion can be earlier, and as a result, the driver does not experience discomfort caused by a torque deficiency.

In step S214, the internal combustion engine control unit 13 determines whether or not an elapsed time following the start of fuel injection has reached or exceeded a predetermined time threshold. When the elapsed time has not reached or exceeded the time threshold, the routine returns to step S213. On the other hand, when the elapsed time has reached or exceeded the time threshold, the routine advances to step S215.

Here, by increasing the time threshold applied to the elapsed time following the start of fuel injection intentionally, the period in which the internal combustion engine 1 can be operated while maintaining the throttle valve 11 at the first throttle opening TH1 can be extended, and as a result, the fuel consumption amount can be reduced in comparison with the conventional control apparatus described in PTL 1.

Note that when the driver requested torque TR2 is greater than the maximum torque of the generator-motor 6, the timing at which the internal combustion engine 1 outputs the torque requested by the driver by means of fuel combustion can be advanced by setting the time threshold applied to the elapsed time following the start of fuel injection intentionally to be small, and as a result, the driver does not experience discomfort caused by a torque deficiency.

When either the determination condition of step S213 or the determination condition of step S214 is satisfied, the routine advances to step S215. More specifically, a determination as to whether or not the internal combustion engine 1 is rotating with stability is made on the basis of either the determination condition of step S213 or the determination condition of step S214. When it can be confirmed as a result of the determination that either the rotation speed of the internal combustion engine 1 has reached the threshold or that sufficient time has elapsed following the start of fuel injection, the routine advances to step S215.

In step S215, since either the determination condition of step S213 or the determination condition of step S214 is satisfied, the internal combustion engine control unit 13 sets the drive torque of the generator-motor 6 at zero. In other words, the internal combustion engine control unit 13 stops the generator-motor 6.

In step S216, at the same time as the generator-motor 6 is stopped in step S215, the internal combustion engine control unit 13 opens the throttle valve 11 to a second throttle opening TH2 that is larger than the first throttle opening TH1. Note that the second throttle opening TH2 is set at an optimum throttle opening employed during idling in the internal combustion engine 1.

At this time, by setting the second throttle opening TH2 of the throttle valve 11 to a throttle opening at which the drive torque of the generator-motor 6 (the first torque TR1) over the period from step S212 to step S215 can be secured, the drive torque of the generator-motor 6 can be set at zero without causing the torque TR2 output by the internal combustion engine 1 to vary, and as a result, the RETURN condition can be established, whereby the processing shown in FIG. 2 is completed.

Figure 3:
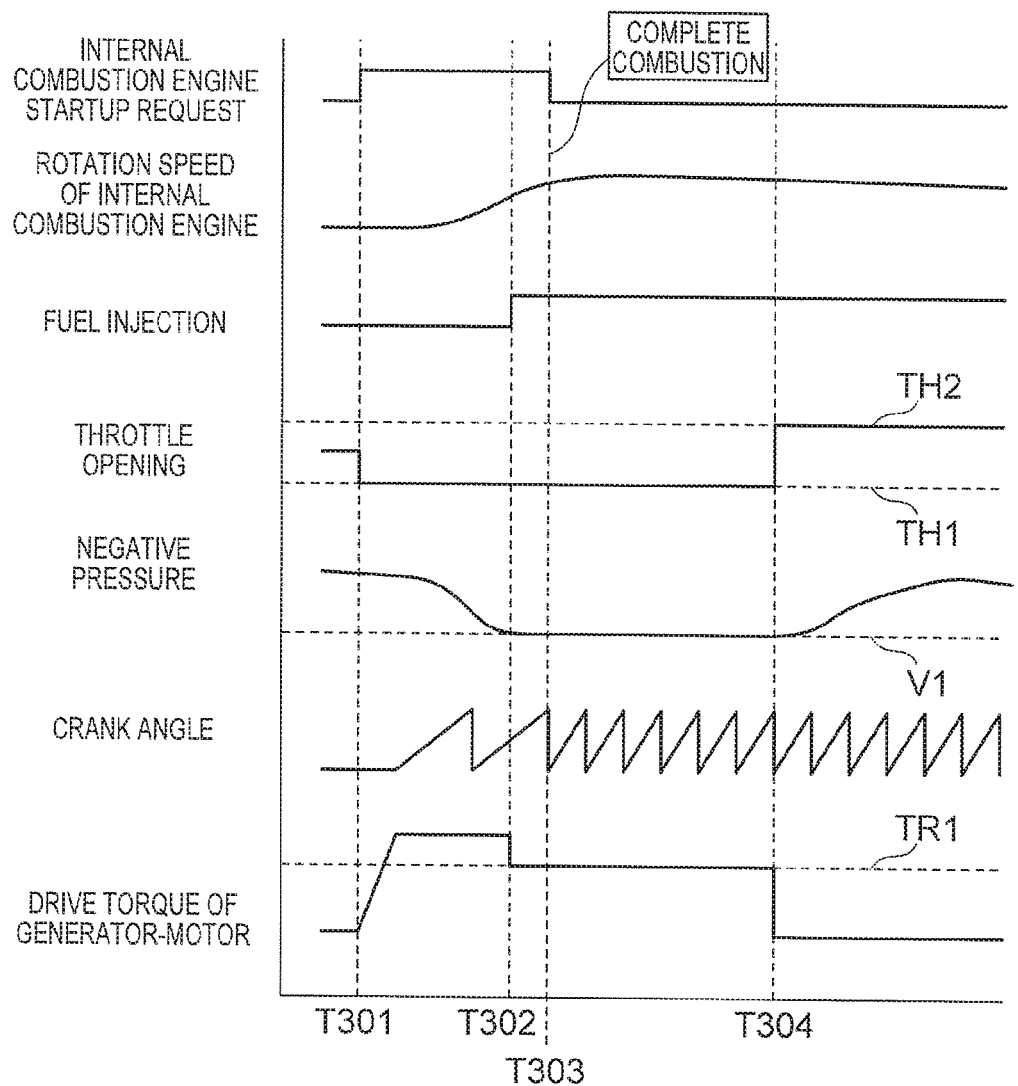
FIG. 3 is a timing chart showing timings of an operation of the internal combustion engine according to the first embodiment of this invention.

FIG. 3 is a time chart of the startup control executed by the control apparatus for an internal combustion engine according to the first embodiment.

At the time T301, when the internal combustion engine control unit 13 detects a startup request, the internal combustion engine control unit 13 controls the throttle valve 11 to open the throttle valve 11 to the first throttle opening TH1. Further, the internal combustion engine control unit 13 controls the generator-motor 6 such that the generator-motor 6 rotates, with the result that the internal combustion engine 1 rotates and negative pressure is generated in the intake passage 10. The drive torque of the generator-motor 6 at this time is a torque at which the rotation speed of the internal combustion engine 1 can be increased quickly to a preset rotation speed.

At the time T302, when the negative pressure in the intake passage 10 decreases to the minimum negative pressure value V1, the internal combustion engine control unit 13 controls the fuel injection valve 9 to start fuel injection. Note that the minimum negative pressure value V1 is a negative pressure value at which the internal combustion engine 1 can be started and shock during complete combustion can be sufficiently suppressed. Further, at the time T302, the internal combustion engine control unit 13 modifies the drive torque of the generator-motor 6 to the first torque TR1.

Hence, in a period from the time T302 to a time T304, the internal combustion engine 1 is driven by the first torque TR1 and the torque TR3. The first torque TR1 is the drive torque of the generator-motor 6. The torque TR3 is the torque output by the internal combustion engine 1 by means of fuel combustion.

At a time T303, a spark plug (not shown) is ignited, whereby an air-fuel mixture taken into the internal combustion engine 1 undergoes complete combustion. At this time, the negative pressure in the intake passage 10 remains in a reduced condition at the minimum negative pressure value V1 at which complete combustion can be achieved in the internal combustion engine 1 and shock can be sufficiently suppressed during complete combustion. Therefore, shock during complete combustion can be suppressed.

Further, at the time T303, the negative pressure in the intake passage 10 reaches the minimum negative pressure value V1 set when the throttle valve 11 is at the first throttle opening TH1. Accordingly, a timing of complete combustion and a timing of a peak of the negative pressure match each other. As a result, shock generated during complete combustion due to a mismatch between the timing of complete combustion and the timing of the peak of the negative pressure can also be suppressed.

At the time T304, either the rotation speed of the internal combustion engine 1 has reached the crank angle threshold following the time T302 or the elapsed time following the time T302 has reached or exceeded the time threshold, and therefore the internal combustion engine control unit 13 determines that the internal combustion engine 1 is rotating with stability. Therefore, at the time T304, the internal combustion engine control unit 13 opens the throttle valve 11 to the second throttle opening TH2, which is larger than the first throttle opening TH1, and simultaneously stops driving the generator-motor 6.

Here, in a period extending from the time T302 to the time T304, the internal combustion engine 1 can be operated while maintaining the throttle opening of the throttle valve 11 at the first throttle opening TH1, at which the minimum negative pressure value V1 enabling complete combustion in the internal combustion engine 1 is obtained. Therefore, the amount of fuel consumed during the period extending from the time T302 to the time T304 can be reduced in comparison with the amount of fuel consumed in the conventional control apparatus of PTL 1.

Hence, in this embodiment, the throttle opening of the throttle valve 11 is set at the first throttle opening TH1 during startup of the internal combustion engine 1. Fuel is then injected from the fuel injection valve 9 at a fuel injection timing calculated on the basis of the detected value of the negative pressure in the intake passage 10 while maintaining the throttle opening at the first throttle opening TH1. The throttle valve 11 is then opened to the second throttle opening TH2. In so doing, complete combustion can be achieved while maintaining the negative pressure in the intake passage 10 in a favorable condition even in a situation where it is necessary to prioritize startability in the internal combustion engine 1, and as a result, shock occurring during complete combustion can be suppressed.

Further, in the period where the rotation speed of the internal combustion engine 1, which is calculated on the basis of the crank angle, equals or exceeds the crank angle threshold following the start of fuel injection or the elapsed time following the start of fuel injection equals or exceeds the time threshold, the internal combustion engine 1 can be rotated and driving of the generator-motor 6 can be continued while maintaining the opening of the throttle valve 11 at the first throttle opening TH1. As a result, the fuel consumption amount can be reduced without the driver sensing a torque deficiency.

Note that likewise when a request to start the internal combustion engine 1 is issued by the driver by depressing the accelerator pedal or the like, as long as the driver requested torque TR2 does not exceed the maximum torque that can be output by the generator-motor 6, shock can be suppressed during complete combustion, and output torque can be secured in the internal combustion engine 1 in accordance with the driver requested torque TR2.

Furthermore, when a request to start the internal combustion engine 1 is issued by the driver by depressing the accelerator pedal or the like and the driver-requested torque TR2 exceeds the maximum torque that can be output by the generator-motor 6, the fuel injection timing can be advanced relative to the fuel injection timing when the driver requested torque TR2 does not exceed the maximum torque of the generator-motor 6 by setting the minimum negative pressure value V1 in the intake passage 10, by which the start timing of fuel injection is determined, to be higher than the minimum negative pressure value V1 when the driver requested torque TR2 does not exceed the maximum torque of the generator-motor 6. As a result, a timing at which startup of the internal combustion engine 1 is begun can be advanced relative to the timing in a case where the driver-requested torque TR2 does not exceed the maximum torque of the generator-motor 6.

In the control method for an internal combustion engine according to this embodiment, as described above, the internal combustion engine control unit 13 sets the throttle valve 11 at the first throttle opening after detecting a request to start the internal combustion engine 1, then causes the fuel injection valve 9 to inject fuel at a fuel injection timing determined using the actual negative pressure in the intake passage 10, detected by the negative pressure detector 12, while maintaining the first throttle opening, and then opens the throttle valve 11 to the second throttle opening TH2 that is larger than the first throttle opening TH1. Accordingly, complete combustion can be achieved while maintaining the negative pressure in the intake passage 10 in a favorable condition. As a result, shock during startup can be suppressed even in a situation where it is necessary to prioritize startability in the internal combustion engine 1.

REFERENCE SIGNS LIST

1 internal combustion engine, 2 crank pulley, 3 crank angle detecting ring gear, 4 crank angle sensor, 5 drive belt, 6 generator-motor, 7 generator-motor drive pulley, 8 exhaust passage, 9 fuel injection valve, 10 intake passage, 11 throttle valve, 12 negative pressure detector, 13 internal combustion engine control unit, 14 accelerator pedal.

The invention claimed is:
1. A control apparatus for an internal combustion engine, comprising:
   a throttle valve that adjusts an amount of air flowing into an intake passage of the internal combustion engine;
   a fuel injection valve that injects fuel into the internal combustion engine;
   a generator-motor coupled to the internal combustion engine via a belt in order to drive the internal combustion engine; and
   an internal combustion engine control unit that controls the throttle valve, the fuel injection valve, and the generator-motor,
   wherein the internal combustion engine control unit opens the throttle valve to a first throttle opening after detecting a request to start the internal combustion engine, then causes the fuel injection valve to inject fuel while maintaining the throttle valve at the first throttle opening, and then opens the throttle valve to a second throttle opening that is larger than the first throttle opening, and
   wherein the internal combustion engine control unit enables fuel injection to begin before the engine has started in response to a measurement of a negative pressure in the intake passage that is equal to or less than a threshold pressure value,
   wherein, when a drive torque of the generator-motor corresponding to a torque requested by a driver is less than or equal to a maximum drive torque of the generator-motor, the threshold pressure value is a minimum negative pressure value at which complete combustion can be achieved in the internal combustion engine, and
   wherein, when the drive torque of the generator-motor corresponding to the torque requested by the driver is greater than the maximum drive torque of the generator-motor, the threshold pressure value is a pressure value that is higher than the minimum negative pressure value at which complete combustion can be achieved in the internal combustion engine.

2. The control apparatus for an internal combustion engine according to claim 1, wherein the first throttle opening is set at a throttle opening at which a minimum negative pressure value enabling complete combustion in the internal combustion engine is generated.

3. The control apparatus for an internal combustion engine according to claim 1, wherein the second throttle opening is set at a throttle opening at which to obtain a drive torque of the generator-motor over a period extending from a time at which the drive torque of the generator-motor is set at a drive torque corresponding to a driver-requested torque to a time at which the generator-motor is stopped.

4. The control apparatus for an internal combustion engine according to claim 1, wherein the internal combustion engine control unit determines whether or not the internal combustion engine is rotating with stability after the fuel injection valve starts to inject fuel, and opens the throttle valve to the second throttle opening after determining that the internal combustion engine is rotating with stability.

5. The control apparatus for an internal combustion engine according to claim 4, wherein a determination condition for determining whether or not the internal combustion engine is rotating with stability is whether or not a rotation speed of the internal combustion engine has reached a threshold after the fuel injection valve starts to inject fuel.

6. The control apparatus for an internal combustion engine according to claim 4, wherein a determination condition for determining whether or not the internal combustion engine is rotating with stability is whether or not an elapsed time after the fuel injection valve starts to inject fuel has reached a threshold.

7. The control apparatus for an internal combustion engine according to claim 1, wherein the internal combustion engine control unit opens the throttle valve to the second throttle opening and simultaneously stops driving the generator-motor.

8. The control apparatus for an internal combustion engine according to claim 1, wherein the internal combustion engine control unit varies a fuel injection timing of the fuel injection valve in accordance with a driver-requested torque requested by a driver during startup of the internal combustion engine.

9. A control apparatus for an internal combustion engine, comprising:
- a throttle valve that adjusts an amount of air flowing into an intake passage of the internal combustion engine;
- a fuel injection valve that injects fuel into the internal combustion engine;
- a generator-motor coupled to the internal combustion engine via a belt in order to drive the internal combustion engine; and
- an internal combustion engine control unit that controls the throttle valve, the fuel injection valve, and the generator-motor,
- wherein the internal combustion engine control unit opens the throttle valve to a first throttle opening after detecting a request to start the internal combustion engine, then causes the fuel injection valve to inject fuel while maintaining the throttle valve at the first throttle opening, and then opens the throttle valve to a second throttle opening that is larger than the first throttle opening, and
- wherein when fuel injection is beginning for the internal combustion engine, the internal combustion engine control unit enables fuel injection to begin before the engine has started in response to a measurement of a negative pressure in the intake passage that is equal to or less than a threshold pressure value,
- wherein, when a drive torque of the generator-motor corresponding to a torque requested by a driver is less than or equal to a maximum drive torque of the generator-motor, the threshold pressure value is a minimum negative pressure value at which complete combustion can be achieved in the internal combustion engine, and
- wherein, when the drive torque of the generator-motor corresponding to the torque requested by the driver is greater than the maximum drive torque of the generator-motor, the threshold pressure value is a pressure value that is higher than the minimum negative pressure value at which complete combustion can be achieved in the internal combustion engine.

* * * * *